Dec. 16, 1969     D. L. COY     3,483,799
FLUID TRANSMISSION APPARATUS
Filed April 1, 1968     3 Sheets-Sheet 2
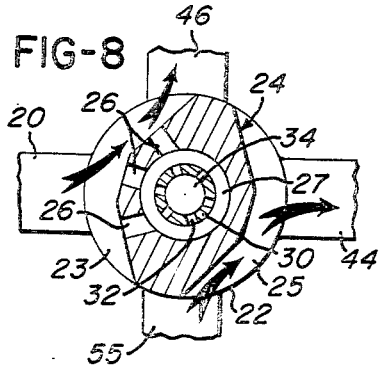
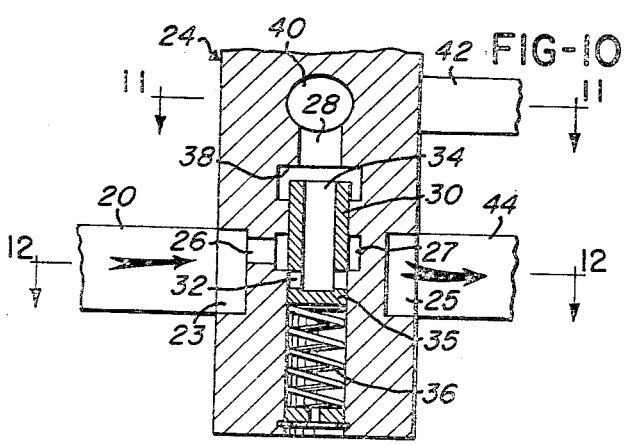
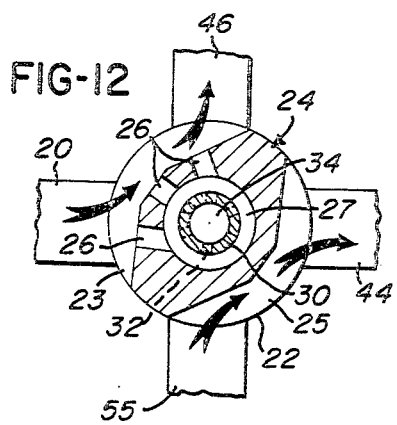
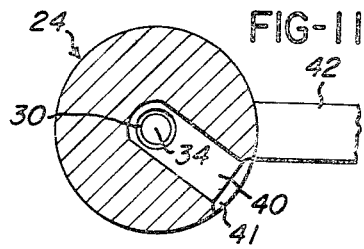
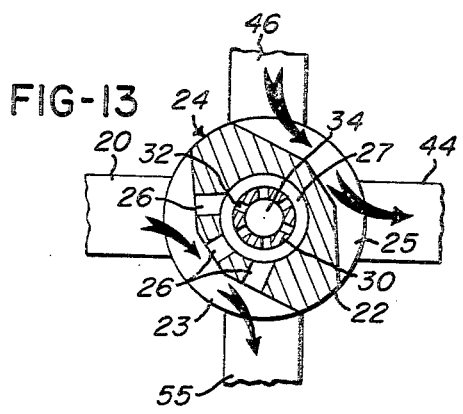
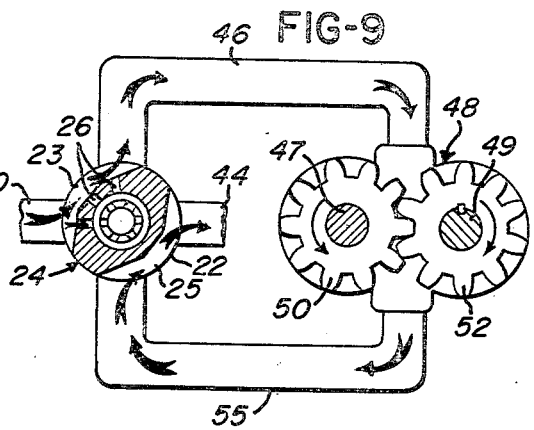
INVENTOR
DONALD L. COY
BY *William R Jacox*
ATTORNEY

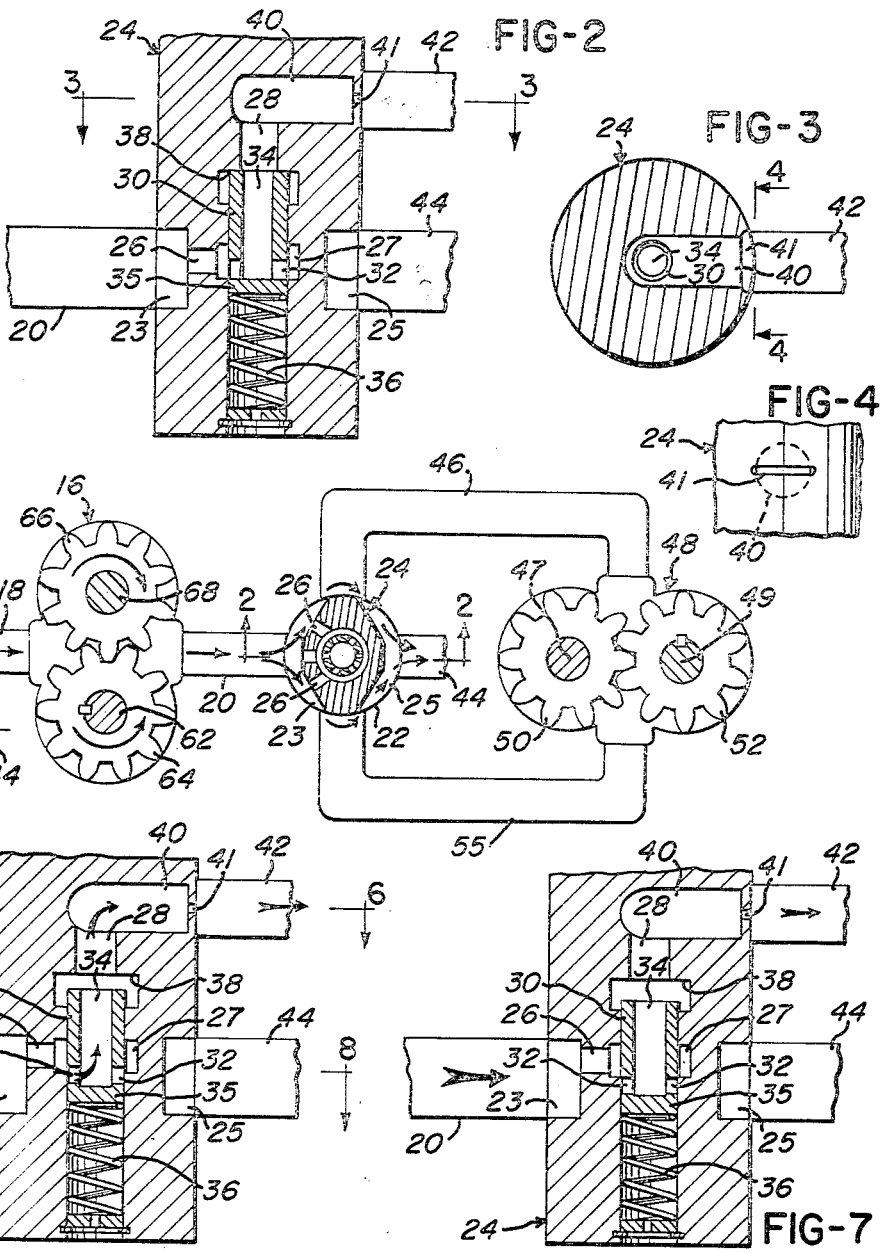

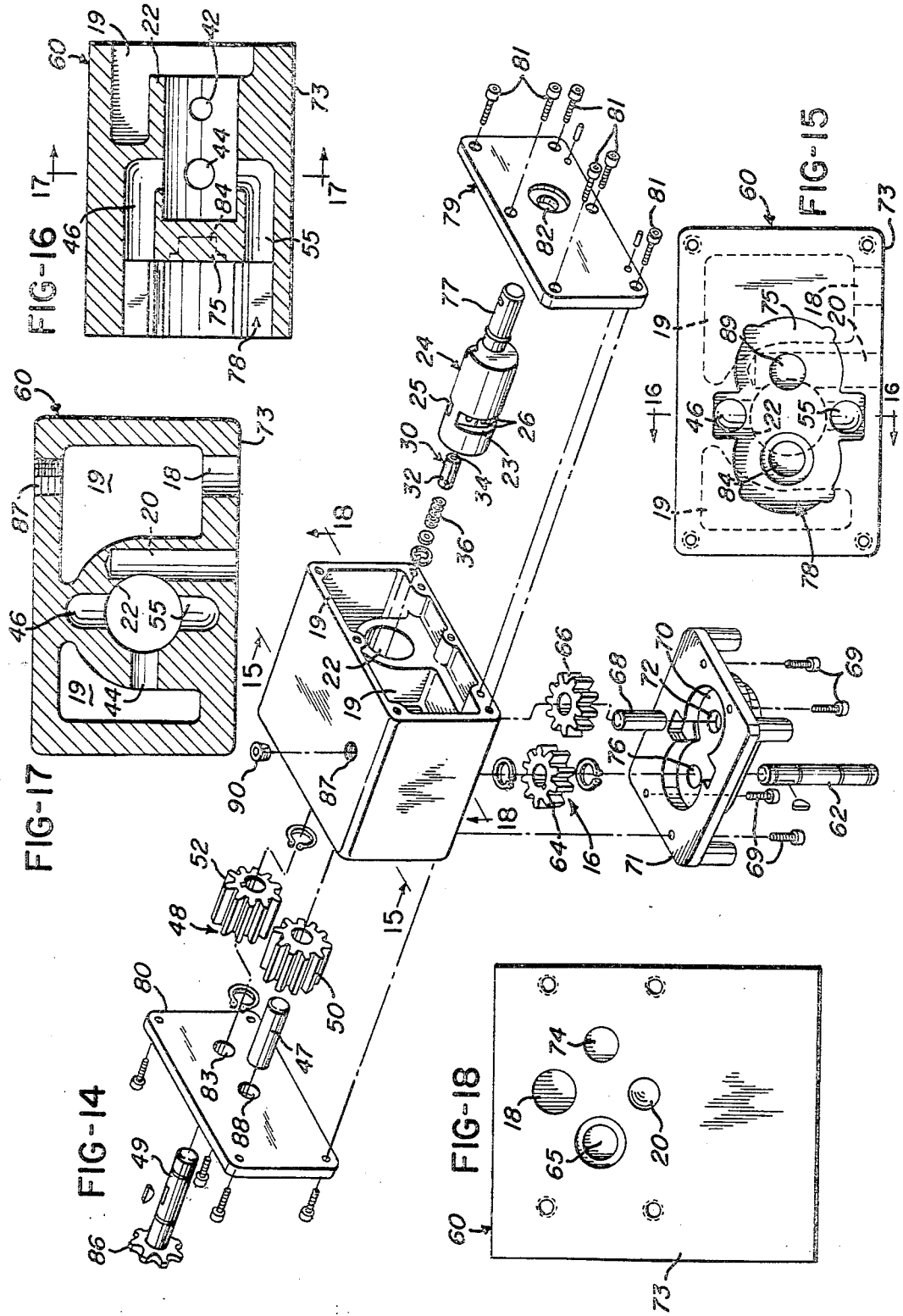

United States Patent Office 3,483,799
Patented Dec. 16, 1969

3,483,799
FLUID TRANSMISSION APPARATUS
Donald L. Coy, Kettering, Ohio, assignor to St. Marys Tool & Die, Inc., a corporation of Ohio
Filed Apr. 1, 1968, Ser. No. 717,707
Int. Cl. F15b 11/08, 15/18; F16d 33/12
U.S. Cl. 91—451                17 Claims

ABSTRACT OF THE DISCLOSURE

Fluid transmission apparatus which includes a source of fluid and fluid motor means operable thereby. Fluid conduit means joins the source of fluid to the fluid motor means. Valve means disposed within the conduit means provides speed control to the fluid motor means by changing the volume of fluid flow to the motor means. However, as a result of operation of the valve means, the output torque capacity of the fluid motor means remains substantially constant regardless of the rate of operation of the fluid motor means.

BACKGROUND OF THE INVENTION

Numerous types of fluid transmission apparatus have been provided by which the rate of operation of a fluid motor is controlled. However, in the past, change in rate of operation of a fluid motor has resulted in a change in the torque capacity of the fluid motor.

It is an object of this invention to provide fluid transmission apparatus by which the rate of operation of a fluid motor is controlled by controlling the volume of fluid flow to the fluid motor while maintaining the average pressure of the fluid flowing to the fluid motor at a substantially constant value.

Another object of this invention is to provide such apparatus which is extremely compact, having a minimum physical size in consideration of its output capacity.

Other objects and advantages reside in the construction of the invention, combinations thereof, the method of manufacture, and the mode of operation, as will become more apparent from the following description.

BRIEF DESCRIPTION OF THE DRAWINGS

FIGURE 1 is a diagrammatic view of fluid transmission apparatus of this invention.

FIGURE 2 is an enlarged sectional view taken substantially on line 2—2 of FIGURE 1.

FIGURE 3 is a sectional view taken substantially on line 3—3 of FIGURE 2.

FIGURE 4 is an elevational view taken substantially on line 4—4 of FIGURE 3.

FIGURE 5 is a sectional view, similar to FIGURE 2, but showing elements in another position of operation.

FIGURE 6 is a sectional view taken substantially on line 6—6 of FIGURE 5.

FIGURE 7 is a sectional view, similar to FIGURES 2 and 5, but showing elements in another position of operation.

FIGURE 8 is a sectional view taken substantially on line 8—8 of FIGURE 5.

FIGURE 9 is a diagrammatic view, similar to FIGURE 1, showing elements in another position of operation.

FIGURE 10 is a sectional view, similar to FIGURES 2, 5, and 7, but showing elements in another position of operation.

FIGURE 11 is a sectional view taken substantially on line 11—11 of FIGURE 10.

FIGURE 12 is a sectional view taken substantially on line 12—12 of FIGURE 10.

FIGURE 13 is a sectional view, similar to FIGURES 8 and 12, but showing elements in another position of operation.

FIGURE 14 is a perspective exploded view of a unit which may be constructed in accordance with this invention.

FIGURE 15 is an end view taken substantially on line 15—15 of FIGURE 14.

FIGURE 16 is a sectional view taken substantially on line 16—16 of FIGURE 15.

FIGURE 17 is a sectional view taken substantially on line 17—17 of FIGURE 16.

FIGURE 18 is a view taken substantially on line 18—18 of FIGURE 14.

DESCRIPTION OF THE PREFERRED EMBODIMENT

FIGURE 1 shows diagrammatically the fluid transmission apparatus of this invention.

The apparatus of this invention includes or makes use of any suitable source of fluid. Preferably, the source of fluid provides fluid at substantiallly constant pressure and at a substantially constant volumetric rate. Herein, a fluid pump 16 is shown connected by a conduit 18 to a source of fluid, such as a reservoir 19 or the like. A conduit 20 joins the fluid pump 16 to a valve housing 22. Within the housing 22 is a main valve member 24 which is provided with opposed recesses or passages 23 and 25. The recess 23 is in communication with the conduit 20. The main valve member 24 is so constructed that passages 26 thereof are in communication with the recess 23. The passages 26 lead to an annular passage 27 and to a central longitudinal passage 28, within the main valve member 24.

The recess or passage 25 of the main valve member 24 is in communication with a conduit 44 which leads to the reservoir 19.

Axially slidably movable within the passage 28 is an auxiliary valve or control member 30. The control member 30 has a plurality of ports 32 which join a longitudinal cavity 34 which is closed at the lower end thereof by an end wall 35. The passage 28 of the main valve member 24 is in communication with the cavity 34 of the control member 30. The end wall 35 of the control member 30 rests upon a resilient member 36 which is within the main valve member 24 and urges the control member 30 upwardly and into engagement with a shoulder 38 at the upper portion of the passage 28. When the control member 30 is in engagement with the shoulder 38, the ports 32 thereof are in communication with the annular passage 27 of the main valve member 24.

The longitudinal passage 28 of the main valve member 24 is in communication with a transverse passage 40. The main valve member 24 is rotatable to align the passage 40 with a conduit 42, as shown in FIGURE 1, or to partially align the passage 40 with the conduit 42, as shown in FIGURE 6. The conduit 42 leads to the reservoir 19. As shown in FIGURE 4, the passage 40 has an orifice 41 at the end thereof which is relatively small so that flow of fluid from the passage 40 to the conduit 42 is restricted, even when the main valve member 24 is in the rotative position shown in FIGURE 3.

The valve housing 22 is joined to a conduit 46 which leads to a fluid motor 48. The fluid motor 48 has an idler shaft 47 and an output shaft 49. The shaft 47 carries a gear 50 which is in mesh with a gear 52, which is carried by the output shaft 49 which is secured thereto for rotation therewith.

A conduit 55 joins the opposite side of the fluid motor 48 to the valve housing 22.

OPERATION

The fluid pump 16 is preferably operated at a substantially constant rate so that fluid at a substantially constant volume and at a substantially constant pressure flows from the reservoir 19, through the conduit 18, through the pump 16, through the conduit 20, and to the valve housing 22.

FIGURE 1 shows the main valve member 24 in neutral position. In such position of the main valve member 24, fluid flows through the recess 23 of the main valve member 24 into the conduit 46, and fluid also flows through the recess 23 into the conduit 55. Furthermore, fluid flows from the conduits 46 and 55, through the recess 25 to the conduit 44, and thence to the reservoir 19. Thus, pressure conditions within the fluid motor 48 are balanced and no operation thereof occurs.

When the main valve member 24 is in neutral position as shown in FIGURE 1, the control member 30 within the passage 28 is maintained, by the resilient member 36, in engagement with the shoulder 38. Therefore, fluid flows through the passages 26 into the annular passage 27, through the ports 32 and into the cavity 34 of the control member 30. Fluid then flows into the passage 28, then into the passage 40, and from the passage 40 into the conduit 42.

When it is desired to cause operation of the fluid motor 48 in the forward direction, as shown in FIGURE 9, the main valve member 24 is rotatively moved to a position such as shown in FIGURES 5, 6, 7, 8, and 9. In such position, the recess 23 of the main valve member 24 is in communication with the conduit 20 and with the conduit 46, but the recess 23 is not in communication with the conduit 55. In such position of the main valve member 24, the recess 25 thereof is in communication with the conduit 55 and with the conduit 44. Thus, fluid flows from the conduit 20, through the recess 23, into the conduit 46, and through the conduit 46 to the fluid motor 48. The fluid then flows through the fluid motor 48 for operation thereof. Then, the fluid flows through the conduit 55, through the recess 25, and into the conduit 44.

A load, not shown, is connected to the output shaft 49 of the fluid motor 48. Therefore, fluid which enters the fluid motor 48 from the conduit 46 creates a pressure within the motor 48 for rotation of the gears 50 and 52. Thus, substantially the same fluid pressure is created within the conduit 46 and within the recess 23 of the main valve member 24. Thus, substantially the same fluid pressure is exerted upon the fluid within the passages 26 of the main valve member 24.

When the main valve member 24 is initially rotatively positioned in the manner illustrated in FIGURES 8 and 9, the control member 30 within the main valve member 24 is positioned in the manner shown in FIGURE 2. Thus, fluid flows through the ports 32, into the cavity 34 of the control member 30, then into the passage 28, and then into the passage 40.

As shown in FIGURE 6, the orifice 41 is partially out of communication with the conduit 42. Therefore, communication between the passage 40 and the conduit 42 is limited. Thus, the volume of fluid flow through the orifice 41 to the conduit 42 is limited. Therefore, even though fluid pressure within the passage 40 is appreciable, fluid cannot flow in a large volume from the passage 40 to the conduit 42. Thus, fluid pressure within the passage 40 and the cavity 34 rapidly increases. Such fluid pressure acts upon the wall 35 of the control member 30 and forces the control member 30 to move downwardly within the passage 28, as shown in FIGURE 7. Such downward movement of the control member 30 is against the resilient forces of the resilient member 36. Thus, the fluid pressure required to move the control member 30 downwardly must be of a value greater than that of the resilient forces of the resilient member 36.

The control member 30 moves downwardly until the ports 32 of the control member 30 are, at least partially, below the passages 26 of the main valve member 24, as shown in FIGURE 7. Thus, communication between the annular passage 27 and the ports 32 is substantially severed. Therefore, fluid pressure within the cavity 34 is limited to a given value which is established by the resilient forces of the resilient member 36.

Fluid pressure within the cavity 34 and the passages 28 and 40 causes fluid therewithin to continue to flow through the orifice 41 of the passage 40 into the conduit 42. Such fluid flow results in gradual decrease of the value of the fluid pressure within the fluid passages 38 and 40 of the main valve member 24 and within the fluid cavity 34 of the control member 30. Thus, the fluid pressure urging the control member 30 downwardly gradually decreases and the control member 30 is gradually forced slightly upwardly as the force of the resilient member 36 overcomes the pressure of the fluid within the cavity 34 of the control member 30. Thus, the control member 30 may gradually rise to the position thereof shown in FIGURE 5 so that the ports 32 have greater communication with the annular passage 27 of the main valve member 24.

Thus, additional fluid moves from the passages 26, through the annular passage 27, and through the ports 32, through the cavity 34 of the control member 30, and into the passages 28 and 40. However, the orifice 41 at the end of the passage 40 continues to restrict the rate of fluid flow from the passage 40 to the conduit 42, and the fluid pressure within the passages 40 and 28 and within the cavity 34 again increases to a value sufficient to force the control member 30 downwardly against the force of the resilient member 36. Therefore, the ports 32 are again moved downwardly to a position substantially out of communication with the annular passage 27. Thus, fluid again substantially ceases to flow into the cavity 34 through the ports 32. As such movement occurs, fluid continues to flow through the orifice 41 and into the conduit 42 and thence returns to the reservoir 19. The upward and downward movement of the control member 30 thus continues as a portion of the fluid flow from the conduit 20 is by-passed to the conduit 42 and returns to the reservoir 19.

The fluid which flows through the fluid motor 48 operates the fluid motor 48 at a rate consistent with the volume of fluid flow therethrough. The volume of fluid flow through the fluid motor 48 is governed by the rotative position of the main valve member 24 with respect to its housing 22. For operation of the fluid motor 48 at a faster rate, the main valve member 24, as viewed in FIGURES 6, 8, 9 and 11, is rotatively moved clockwise. As the main valve member 24 is moved clockwise, the recess 23 provides greater communication between the conduit 20 and the conduit 46. Thus, a greater volumetric rate of fluid flow may occur through the recess 23 to the conduit 46.

Attention is also called to the fact that clockwise movement of the main valve member 24 not only increases communication between the recess 23 and the conduit 46, but such clockwise movement of the main valve member 24 also reduces the communication between the passage 40 and the conduit 42, as shown in FIGURE 3, compared to FIGURE 6. Thus, the volumetric rate of fluid flow through the passage 40 is reduced as the volumetric rate of fluid flow through the recess 23 is increased.

If a maximum rate of operation of the fluid motor 48 is desired, the main valve member 24 is rotatively moved in a clockwise direction to a position such as that shown in FIGURE 12. Thus, the maximum volumetric rate of fluid flows from the conduit 20, through the recess or passage 23 to the conduit 46, and to the fluid motor 48. When the main valve member 24 is positioned as shown in FIGURES 11 and 12, the orifice 41 of the passage 40 is completely out of communication with the conduit 42. Therefore, there is no fluid flow from passage 40 to the conduit 42. Under such conditions, fluid pressure created within the passages 40 and 28 and within the cavity 34 forces the control member 30 downwardly to substantially the position thereof shown in FIGURE 10. The control member 30 remains in such position, as all of the fluid flowing from the conduit 20 flows through the housing 22 to the conduit 46 and to the fluid motor 48.

Therefore, a given fluid pressure or average fluid pressure always exists within the cavity 34. This average fluid pressure is established by the resilient forces of the resilient member 26. Thus, fluid pressure within the cavity 34 and within the passages 28 and 40 is limited to a predetermined maximum value. Fluid pressure in excess of the maximum established in the cavity 34 exists in the annular passage 27, in the ports 26, in the recess 23, and in the conduit 46. Therefore, a given fluid pressure can be created in the conduit 46 for operation of the fluid motor 48, regardless of the volumetric rate of fluid flow to the fluid motor 48. Therefore, the fluid motor 48 has a given available torque, regardless of the rate of operation thereof.

FIGURE 13 shows the main valve member 24 in a rotative position in which fluid from the conduit 20 is directed through the recess 23 to the conduit 55 for operation of the fluid motor 48 in the reverse direction. In such reverse rotative position of the main valve member 24, the rate of operation of the fluid motor 48 is controlled by the rotative position of the main valve member 24 in the same manner as discussed above in regard to forward operation. Also, during operation of the fluid motor 48 in the reverse direction, the control member 30 operates in the manner discussed above.

FIGURES 14–18

FIGURES 14–18 show a possible physical arrangement of elements of the apparatus of this invention. This physical arrangement may be used to provide a compact unit which is minimum in physical size in consideration of the output capacity thereof.

The pump 16 is partially disposed within a recess 70 of a plate 71 which is attached to a surface 73 of a main housing 60, as illustrated in FIGURE 14. Screws 69 are used for such attachment. The pump 16 is shown as having an input shaft 62 to which a gear 64 is attached. The gear 64 is in meshed relationship with a gear 66 which is carried by an idler shaft 68. The gears 64 and 66 are disposed within the recess 70 of the plate 71. The shaft 68 is journalled in a depression 72 in the plate 71 and in a depression 74 in the surface 73 of the main housing 60, as shown in FIGURE 18. The shaft 62 is journalled in an opening 76 in the plate 71 and extends through the opening 76 for attachment to any suitable means, not shown, for rotation thereof. The shaft 62 is also journalled in a depression 65 in the surface 73 of the main housing 60, as shown in FIGURE 18.

The reservoir 19 is within the main housing 60. The conduit 18, shown in FIGURE 1, appears in FIGURES 17 and 18 as being an opening which extends through the surface 73 into the reservoir 19. The valve housing 22 is integral with the main housing 60 and disposed therewithin, as shown in FIGURE 14. The valve housing 22 generally separates the reservoir 19 into two portions. However, the two portions of the reservoir 19 are in complete communication one with the other. The conduit 20, shown in FIGURE 1, appears in FIGURES 17 and 18 as being an opening in the surface 73 which leads into the valve housing 22. The left hand portion of the valve housing 22, as shown in FIGURE 16, is integral with an internal wall 75 which separates the reservoir 19 from a chamber 78 within which the gears 50 and 52 of the fluid motor 48 are disposed.

FIGURE 14 shows the main valve member 24, rotatable within the valve housing 22, and the control member or auxiliary valve member 30 within the main valve member 24. The main valve member 24 has a stem 77 which extends through an opening 82 in an end cover 79. The end cover 79 encloses the reservoir 19 and is attached to the main housing 60 by screws 81. The stem 77 is adapted to be rotatively moved by any suitable means, not shown, for rotative positioning of the main valve member 24.

The conduits 46 and 55, shown diagrammatically in FIGURE 1, appear in FIGURES 15 and 16 as being formed within an integral internal wall 75 of the valve housing 22 and, as shown in FIGURE 16, extend through the internal wall 75 to the chamber 78 in the main housing 60.

The gears 50 and 52 are disposed within the chamber 78 and are carried by their respective shafts 47 and 49. The shaft 47 is journalled in a recess 88 of a cover plate 80 and in a recess 89 of the integral internal wall 75 within the main housing 60. The shaft 49 is journalled in a recess 84 in the internal wall 75 and is also journalled in an opening 83 in the cover plate 80 through which the shaft 49 extends. The portion of the shaft 49 exterior of the cover plate 80 is provided with a sprocket 86 or the like for operative connection to a load.

An opening 87, shown in the upper portion of the main housing 60 in FIGURE 14, is provided for filling the reservoir 19 and is closed by a plug 90.

Thus, it is understood that fluid transmission apparatus may comprise a unit having small physical size in consideration of the output capacity thereof. However, it is to be understood that the fluid transmission apparatus of this invention shown diagrammatically in FIGURES 1–13, may be constructed in a manner other than that illustrated in FIGURES 14–18.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

The invention having thus been described, the following is claimed:

1. Fluid transmission apparatus comprising:
    a source of fluid at a substantially constant volumetric rate of flow and at substantially constant pressure,
    a valve housing,
    inlet conduit means joining the valve housing to the source of fluid,
    a fluid motor,
    conduit means joining the valve housing to the fluid motor,
    by-pass conduit means joined to the valve housing,
    a main valve member within the valve housing, the main valve member having a main passage providing communication between the inlet conduit means and the conduit means,
    the main valve member having a by-pass passage therein, the main valve member having an opening leading from the main passage to the by-pass passage, the by-pass passage also having an outlet orifice, the main valve member being movable to position the outlet orifice in communication with the by-pass conduit means,
    a control member movably disposed within the by-pass passage of the main valve member, the control member being movable toward and away from the outlet orifice, the control member being movable to close the opening which leads from the main passage to the by-pass passage, the control member having a cavity in communication with the by-pass passage of the main valve member, the control member having a port leading to the cavity thereof, the control member being movable to position the port thereof in communication with the opening which leads from the main passage to the by-pass passage, engagement means within the by-pass passage of the main valve member and engageable by the control member to limit movement of the control member in a direction toward the outlet orifice of the by-pass passage, the port of the control member being in communication with the opening which leads from the main passage to the by-pass passage when the control member is in engagement with the engagement means, resilient means within the main valve member urging movement of the control member toward the engagement means, fluid pressure being created within the by-pass passage as fluid attempts to flow outwardly therefrom through the orifice to the by-pass conduit and as flow of fluid from the by-pass passage is restricted by the outlet orifice, such fluid pressure within the by-pass passage acting upon the control member and causing movement thereof in a direction from the engagement means, the main valve member thus being movable to adjust the volume of fluid flow through the main passage thereof to the conduit means and to the fluid motor, the rate of operation of the fluid motor being governed by the volume of fluid flow therethrough, the main valve member being adjustably movable to direct only a portion of the fluid from the source of fluid through the main passage thereof and to the conduit means and to the fluid motor, the remainder of the fluid from the source of fluid entering the opening and flowing into the by-pass passage, the outlet orifice of the by-pass passage restricting flow of fluid therefrom so that pressure is created within the by-pass passage, fluid pressure in the by-pass passage acting upon the control member and causing movement of the control member in a direction away from the limit means so that communication between the main passage and the by-pass passage is reduced, such movement of the control member being against the resilient forces of the resilient member, substantially constant fluid pressure thus being maintained in the by-pass passage, substantially constant fluid pressure thus being maintained in the conduit means, substantially constant available torque output of the fluid motor thus being maintained independent of the rate of operation thereof, the degree of communication of the main passage with the conduit means and the degree of communication of the outlet orifice with the by-pass conduit being simultaneously adjustable by adjustable movement of the main valve member.

2. In fluid transmission apparatus, pressure regulating valve mechanism comprising:

a housing having at least one inlet opening and a plurality of outlet openings, a rotary valve member within the housing, the rotary valve member having a main passage therethrough, the rotary valve member having an auxiliary passage therethrough, there being a port leading from the main passage to the auxiliary passage, the auxiliary passage having a restricted outlet portion of reduced area at the outlet end thereof, the rotary valve member being rotatively movable to position the outlet end of the auxiliary passage in communication with one of the outlet openings of the housing, a control member within the auxiliary passage of the rotary valve member, the control member being movable to a position in which the control member obstructs the port which leads from the main passage to the auxiliary passage, the control member having a port which is in communication with the auxiliary passage, the control member being movable to position the port thereof in communication with the port of the rotary valve member, limit means within the auxiliary passage, the limit means being engageable by the control member for limiting movement of the control member, resilient means within the rotary valve member urging axial movement of the control member toward the limit means, the port of the control member being in communication with the port of the rotary valve member when the control member is in engagement with the limit means, the rotary valve member being rotatively adjustable to position the main passage in communication with an inlet opening and in communication with an outlet opening to direct flow of fluid from the inlet opening to the outlet opening, the rotary valve member being rotatively adjustable to provide any desired degree of communication between the main passage and the outlet opening so that any desired portion of the fluid is directed from the inlet opening to the outlet opening, the remaining portion of the fluid from the inlet opening being directed through the auxiliary passage and outwardly through the restricted outlet portion and into an outlet opening, the restricted outlet portion restricting the fluid flow therethrough so that fluid pressure is created within the auxiliary passage, such fluid pressure within the auxiliary passage acting upon the control member and causing movement of the control member toward a position to obstruct the port through which fluid flows from the main passage to the auxiliary passage, fluid flow through the auxiliary passage thus being controlled by the control member in response to pressure applied thereto by fluid within the auxiliary passage between the restricted outlet portion and the control member, the control member thus maintaining at a substantially constant value the pressure of the fluid which flows in the main passage from the inlet opening of the housing to the outlet opening thereof.

3. Fluid pressure regulating valve apparatus comprising:

a valve housing having at least one inlet opening and at least one outlet opening, a main valve member having a passage therethrough, the main valve member being movable to position the passage in communication with an inlet opening of the valve housing, the main valve member being movable to position the passage in communication with an outlet opening of the valve housing, the passage having an outlet portion, an auxiliary valve member movably disposed within the passage of the main valve member, the auxiliary valve member being movable to a position to close the passage, the auxiliary valve member being movable to a position to permit fluid flow through the passage, resilient means within the main valve member urging movement of the auxiliary valve member to a position to permit fluid flow through the passage, fluid pressure being created within the passage by fluid therewithin, such fluid pressure being operable upon the auxiliary valve member to move the auxiliary valve member toward a position to close the passage, such movement of the auxiliary valve member being against the resilient forces of the resilient means, the position of the auxiliary member thus being controlled by the resilient means in a manner to maintain substantially constant fluid pressure within the passage.

4. The apparatus of claim 3 in which the passage has an orifice of relatively small area through which fluid flows from the passage to an outlet opening of the valve housing when the main valve member is moved so that the passage is in communication with an outlet opening.

5. The apparatus of claim 3 in which the main valve member has a second flow passage, the main valve member being movable to position the second flow passage in communciation with an inlet opening and with an outlet opening.

6. The apparatus of claim 5 in which the main valve member is movable in a direction to position the second flow passage in greater communication with an outlet opening while movement in the same direction positions the first said passage in lesser communication with an outlet opening.

7. The apparatus of claim 3 in which the main valve member is rotatable.

8. The apparatus of claim 3 in which the auxiliary valve member is axially movable.

9. The apparatus of claim 5 in which there is communication between the second flow passage and the first said passage.

10. Fluid transmission apparatus comprising:
fluid pump means,
fluid motor means,
fluid reservoir means,
fluid valve means,
first fluid conduit means, the first fluid conduit means joining the fluid reservoir means to the fluid pump means,
second conduit means, the second conduit means joining the fluid pump means to the fluid valve means,
third conduit means, the third conduit means joining the fluid valve means to the fluid motor means,
fourth conduit means, the fourth conduit means joining the fluid valve means to the fluid reservoir means,
the fluid valve means including a main valve member provided with a main passage, the main valve member being operable to move the main passage into communication with the second conduit means and with the third conduit means for flow of fluid from the second conduit means to the third conduit means, there being an auxiliary passage in the main valve member in communication with the main passage thereof, the main valve member being operable to move the auxiliary passage into communication with the fourth conduit means, the fluid valve means including an auxiliary valve within the auxiliary passage and controlling flow of fluid from the main passage to the fourth conduit means, the auxiliary valve having a fully open position and a fully closed position, the auxiliary valve having a plurality of positions between the fully open position and the fully closed position,
at least a portion of the fluid which flows from the second conduit means thus flowing through the main passage and to the third conduit means and to the fluid motor means, any remaining portion of the fluid which flows from the second conduit means thus flowing through the auxiliary passage when the auxiliary passage is in communication with the fourth conduit means, the ratio between the volume of fluid flow from the second conduit means to the third conduit means with respect to the volume of fluid flow from the second conduit means to the auxiliary passage being determined by the operative position of the maain valve member, as the main valve member is operable to establish the degree of communication between the main passage and the third conduit means while simultaneously estalishing the degree of communication between the auxiliary passage and the fourth conduit means,
means urging the auxiliary valve toward open position, means limiting movement of the auxiliary valve in a direction toward open position, the auxiliary valve being movable toward closed position by fluid pressure thereupon, such movement of the auxiliary valve toward closed position being against the forces of the means urging the auxiliary valve toward open position,
maximum fluid pressure in the auxiliary passage thus being established by operation of the auxiliary valve in the auxiliary passage, maximum fluid pressure in the main passage thus being established by operation of the auxiliary valve in the auxiliary passage, the maximum fluid pressure thus being established in the third conduit means for operation of the fluid motor means, maximum torque for operation of the fluid motor means thus being established by operation of the auxiliary valve, the auxiliary valve establishing the same value of maximum torque for operation of the fluid motor means at any operative position of the main valve member.

11. The apparatus of claim 10 in which the fluid pump means, the fluid motor means, the fluid reservoir means, the fluid valve means, and the fluid conduit means comprise a unit including a main housing, internal wall members within the main housing and integral therewith, the internal wall members separating the main housing into a reservoir, a fluid motor chamber, and a valve housing, the conduit means consisting of passages in and through the internal wall members of the housing.

12. Valve mechanism comprising:
a housing,
a main valve member within the housing and having a main passage, the main valve member being operable to control flow of fluid through the main passage, the main valve member having an auxiliary passage therethrough, the auxiliary passage being in communication with the main passage, the auxiliary passage having a restricted outlet portion,
an auxiliary valve member within the auxiliary passage of the main valve member and movable to a position to close the auxiliary passage, the auxiliary valve member being movable to a position to close the auxiliary passage in response to pressure applied to the auxiliary valve member by fluid within the auxiliary passage between the restricted outlet portion and the auxiliary valve member, the auxiliary valve member also being movable to a position in which the auxiliary passage is open,
resilient means within the main valve member and urging movement of the auxiliary valve member to a position in which the auxiliary passage is open,
the volume of fluid flow through the auxiliary passage and outwardly therefrom through the restricted outlet portion being limited, fluid pressure thus being created within the auxiliary passage which pressure acts upon the auxiliary valve member and urges the auxiliary valve member to move toward a position to close the auxiliary passage, fluid flow through the auxiliary passage thus being controlled by the auxiliary valve member in accordance with the pressure of the fluid acting thereupon, the pressure of fluid in the main passage thus being controlled by the auxiliary valve member.

13. Valve mechanism according to claim 12 in which the main valve member is rotatably operable to control fluid flow through the housing.

14. Valve mechanism according to claim 12 in which the auxiliary valve member is linearly movable.

15. Valve mechanism according to claim 12 which includes limit means engageable by the auxiliary valve member to limit the movement thereof in a direction toward the restricted outlet portion of the passage.

16. Valve mechanism according to claim 12 in which the housing has at least one inlet opening and at least one outlet opening, the passage through the main valve member having an inlet which is in communication with an inlet opening of the housing, the main valve member being movable to position the restricted outlet portion of the passage in communication with an outlet opening of the housing.

17. Fluid transmission apparatus of the type provided with fluid pump means, fluid motor means, and fluid conduit means joining the fluid pump means to the fluid motor means, the improvement comprising:

fluid valve means, the fluid valve means having a main passage and an auxiliary passage in communication therewith, the fluid valve means including main valve means controlling fluid flow through the main passage, the main passage having an inlet portion in communication with the fluid conduit means so that fluid from the fluid pump means flows into the main passage and into the auxiliary passage, the main passage having an outlet portion in communication with the conduit means so that fluid flows from the main passage to the fluid motor means, the fluid valve means including fluid pressure regulator means controlling fluid flow through the auxiliary passage, the fluid valve means being adjustable to control the volume of fluid flow through the main passage with respect to the volume of fluid flow through the auxiliary passage, fluid pressure regulator means controlling flow of fluid through the auxiliary passage in response to the pressure of the fluid in the auxiliary passage, the fluid pressure regulator means thus determining the pressure of fluid which flows in the main passage, the fluid pressure regulator means thus determining the pressure of the fluid which flows to the fluid motor means, regardless of the volumetric rate of fluid flow to the fluid motor means.

References Cited

UNITED STATES PATENTS

| | | | |
|---|---|---|---|
| 2,243,364 | 5/1941 | Trautman | 91—449 XR |
| 2,594,664 | 4/1952 | Livers et al. | 60—52 XR |
| 2,603,065 | 7/1952 | Sarto. | |
| 2,737,196 | 3/1956 | Eames. | |
| 3,185,439 | 5/1965 | Inaba et al. | 253—1 |

EDGAR W. GEOGHEGAN, Primary Examiner

U.S. Cl. X.R.

137—596.13, 625.29; 60—53; 91—467